(12) United States Patent
Liu

(10) Patent No.: US 11,284,373 B2
(45) Date of Patent: Mar. 22, 2022

(54) PAGING METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/035,236

(22) Filed: Sep. 28, 2020

(65) Prior Publication Data

US 2021/0029670 A1  Jan. 28, 2021

Related U.S. Application Data

(63) Continuation of application No. PCT/CN2018/082206, filed on Apr. 8, 2018.

(51) Int. Cl.
*H04W 60/00* (2009.01)
*H04W 68/12* (2009.01)
*H04W 88/06* (2009.01)

(52) U.S. Cl.
CPC ......... *H04W 68/12* (2013.01); *H04W 60/005* (2013.01); *H04W 88/06* (2013.01)

(58) Field of Classification Search
CPC ...... H04W 60/00; H04W 88/06; H04W 12/06
See application file for complete search history.

(56) References Cited

U.S. PATENT DOCUMENTS

| | | | |
|---|---|---|---|
| 8,644,824 B1 | 2/2014 | Sigg et al. | |
| 9,345,063 B2 | 5/2016 | Jain et al. | |
| 2007/0127498 A1 | 6/2007 | Kim et al. | |
| 2010/0041393 A1* | 2/2010 | Kwon ................... | H04W 68/00 455/426.1 |

(Continued)

FOREIGN PATENT DOCUMENTS

| | | |
|---|---|---|
| CN | 101552980 A | 10/2009 |
| CN | 102014484 A | 4/2011 |

(Continued)

OTHER PUBLICATIONS

Supplementary European Search Report issued in corresponding European Application No. EP 18 91 4552.7, dated Mar. 19, 2021, 7 pages.

(Continued)

*Primary Examiner* — Michael T Vu
(74) *Attorney, Agent, or Firm* — Bayes PLLC

(57) ABSTRACT

Provided in the embodiments of the present disclosure are a paging method, a network device, and a terminal device. The method includes when a second network device determines that downlink data of a terminal device arrives, a first network device sending a first paging message to the terminal device. The first paging message is used to page the terminal device for the second network device. The first network device is a network device in a first network, the second network device is a network device in a second network, and the first network and the second network are different networks among a plurality of networks registered by the terminal device.

18 Claims, 4 Drawing Sheets

200

WHEN A SECOND NETWORK DEVICE DETERMINES THAT DOWNLINK DATA OF A TERMINAL DEVICE ARRIVES, A FIRST NETWORK DEVICE SENDS A FIRST PAGING MESSAGE TO THE TERMINAL DEVICE, THE FIRST PAGING MESSAGE BEING USED TO PAGE THE TERMINAL DEVICE FOR THE SECOND NETWORK DEVICE, WHEREIN THE FIRST NETWORK DEVICE IS A NETWORK DEVICE IN A FIRST NETWORK, THE SECOND NETWORK DEVICE IS A NETWORK DEVICE IN A SECOND NETWORK, AND THE FIRST NETWORK AND THE SECOND NETWORK ARE DIFFERENT NETWORKS AMONG A PLURALITY OF NETWORKS REGISTERED BY THE TERMINAL DEVICE ⟶ S210

(56) References Cited

U.S. PATENT DOCUMENTS

2020/0015192 A1\* 1/2020 Chun .................... H04W 60/00

FOREIGN PATENT DOCUMENTS

| CN | 102067692 A | 5/2011 |
| CN | 103096420 A | 5/2013 |
| CN | 104969659 A | 10/2015 |
| EP | 3675556 A1 | 7/2020 |
| WO | 2019195967 A1 | 10/2019 |

OTHER PUBLICATIONS

PCT Written Opinion of the International Searching Authority issued in corresponding International Application No. PCT/CN2018/082206, dated Jan. 14, 2019, 9 pages.
"3rd Generation Partnership Project; Technical Specification Group Services and System Aspects; System Architecture for the 5G System", Stage 2 (Release 15), 3GPP TS 23.501 V1.0.0 (Jun. 2017), Technical Specification, 147 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description", Stage 2 (Release 14), 3GPP TS 36.300 V14.0.0 (Sep. 2016), Technical Specification, 314 pages.
The First Office Action issued in corresponding Chinese Application No. No 201880078315.4, dated Sep. 9, 2021, 16 pages.

\* cited by examiner

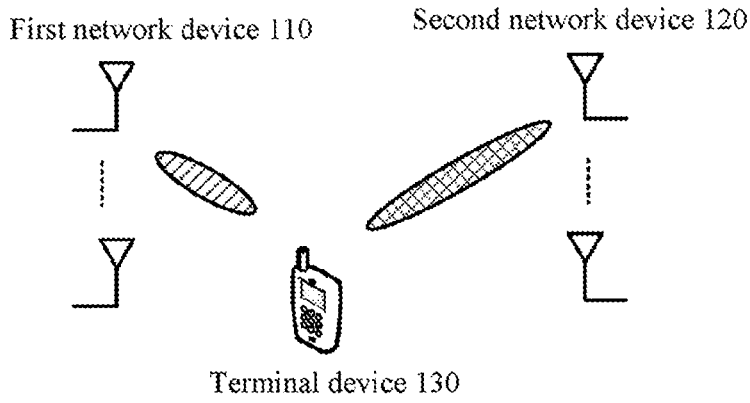

First network device 110
Second network device 120
Terminal device 130

WHEN A SECOND NETWORK DEVICE DETERMINES THAT DOWNLINK DATA OF A TERMINAL DEVICE ARRIVES, A FIRST NETWORK DEVICE SENDS A FIRST PAGING MESSAGE TO THE TERMINAL DEVICE, THE FIRST PAGING MESSAGE BEING USED TO PAGE THE TERMINAL DEVICE FOR THE SECOND NETWORK DEVICE, WHEREIN THE FIRST NETWORK DEVICE IS A NETWORK DEVICE IN A FIRST NETWORK, THE SECOND NETWORK DEVICE IS A NETWORK DEVICE IN A SECOND NETWORK, AND THE FIRST NETWORK AND THE SECOND NETWORK ARE DIFFERENT NETWORKS AMONG A PLURALITY OF NETWORKS REGISTERED BY THE TERMINAL DEVICE ～S210

The second network device determines that downlink data of the terminal device arrives ～S310

The second network device sends a first paging message to the terminal device through the first network device, where the first network device is a network device in a first network, the second network device is a network device in a second network, and the first network and the second network are different networks among a plurality of networks registered by the terminal device ～S320

Fig.3

PAGING METHOD, NETWORK DEVICE AND TERMINAL DEVICE

CROSS-REFERENCE TO RELATED APPLICATION

This application is a continuation of International Application No. PCT/CN2018/082206, filed on Apr. 8, 2018, which is incorporated by reference in its entirety.

BACKGROUND

The present disclosure relates to the field of communications, and more specifically, to a paging method, a network device, and a terminal device.

For a multi-mode terminal, the terminal device can register in multiple systems (or networks). Therefore, the terminal device needs to monitor paging messages of multiple systems at the same time, resulting in high power consumption of the terminal device. In this case, how to perform paging to reduce the power consumption of the terminal device is a problem worthy of study.

SUMMARY

The embodiments of the present disclosure provide a paging method, a network device, and a terminal device, which can reduce the power consumption of the terminal device.

According to a first aspect, there is provided a paging method, including when a second network device determines that downlink data of a terminal device arrives, sending, by a first network device, a first paging message to the terminal device, wherein the first paging message is used for the second network device to page the terminal device; and wherein the first network device is a network device in a first network, the second network device is a network device in a second network, and the first network and the second network are different networks among a plurality of networks registered by the terminal device Therefore, in the embodiments of the present disclosure, the terminal device may register in a plurality of networks, but paging of the terminal device by the plurality of networks is only performed in a specific network or networks, so that the terminal device can only listen to the paging message of the specific one or more networks, which is beneficial to the power saving of the terminal device.

Optionally, in the embodiments of the present disclosure, the first paging message may be an existing message, and the existing message carries indication information for indicating that the first paging message is used for the second network device to page the terminal device, or the first paging message may also be a newly added message type, which is specifically used to page the terminal device for the network devices in other networks, which is not limited in the embodiments of the present disclosure.

In some possible implementation manners, the method further includes receiving, by the first network device, a first message sent by the second network device, wherein the first message is used to notify the first network device that the second network device needs to send downlink data to the terminal device.

In some possible implementation manners, the sending, by the first network device, the first paging message to the terminal device includes sending, by the first network device, the first paging message to the terminal device in a first registration area, wherein the first registration area is a registration area of the terminal device in the first network.

In some possible implementation manners, the sending, by the first network device, the first paging message to the terminal device includes sending, by the first network device, the first paging message to the terminal device in a second registration area, wherein the second registration area is a registration area of the terminal device in the second network.

In some possible implementation manners, the method further includes receiving, by the first network device, a second message sent by the second network device, wherein the second message is used to notify the first network device of information about the second registration area.

In some possible implementation manners, the first paging message includes indication information, and the indication information is used to indicate at least one of identification information of the second network device, standard information of the second network, or identification information of the terminal device in the second network.

In some possible implementation manners, the method further includes receiving, by the first network device, the indication information sent by the second network device.

In some possible implementation manners, the method further includes: receiving, by the first network device, a third message sent by the terminal device, wherein the third message is used to notify the first network device that the terminal device has replied to the second network device with a first paging response message.

In some possible implementation manners, the method further includes receiving, by the first network device, a fourth message sent by the second network device, wherein the fourth message is used to notify the first network device that the second network device has received a first paging response message returned by the terminal device, or the fourth message is used to notify the first network device to stop paging the terminal device.

In some possible implementation manners, the method further includes when the second network device does not receive a first paging response message returned by the terminal device, receiving, by the first network device, a fifth message sent by the second network device, wherein the fifth message is used to notify the first network device to page the terminal device again.

In some possible implementation manners, the method further includes when both the first network device and the second network device determine that the downlink data of the terminal device arrives, sending, by the first network device, a second paging message to the terminal device, wherein the second paging message comprises a paging message for the terminal device by the first network device and the second network device.

In some possible implementation manners, the method further includes receiving, by the first network device, a second paging response message returned by the terminal device.

In some possible implementation manners, the first network and the second network are networks in the same public land mobile network (PLMN), or the first network and the second network are networks in different PLMNs.

According to a second aspect, there is provided a paging method, including determining, by a second network device, that downlink data of a terminal device arrives; and sending, by the second network device, a first paging message to the terminal device through a first network device, wherein the first network device is a network device in a first network, the second network device is a network device in a second network, and the first network and the second network are different networks among a plurality of networks registered by the terminal device.

In some possible implementation manners, the method further includes sending, by the second network device, a first message to the first network device, wherein the first message is used to notify the first network device that the second network device needs to send downlink data to the terminal device.

In some possible implementation manners, the method further includes sending, by the second network device, a second message to the first network device, wherein the second message is used to notify the first network device of a second registration area of the terminal device in the second network.

In some possible implementation manners, the first paging message includes indication information, and the indication information is used to indicate at least one of identification information of the second network device, standard information of the second network, or identification information of the terminal device in the second network.

In some possible implementation manners, the method further includes sending, by the second network device, the indication information to the first network device.

In some possible implementation manners, the method further includes sending, by the second network device, a fourth message to the first network device, wherein the fourth message is used to notify the first network device that the second network device has received a first paging response message returned by the terminal device, or the fourth message is used to notify the first network device to stop paging the terminal device.

In some possible implementation manners, the method further includes when the second network device does not receive a first paging response message returned by the terminal device, sending, by the second network device, a fifth message to the first network device, wherein the fifth message is used to notify the first network device to page the terminal device again.

In some possible implementation manners, the method further includes receiving, by the second network device, a sixth message sent by the terminal device, wherein the sixth message comprises information of the first network device.

In some possible implementation manners, the sixth message further includes a first request, and the first request is used to request to respond to the paging message of the second network device in the first network.

In some possible implementation manners, the second network device accepts or rejects the first request of the terminal device.

In some possible implementation manners, the first network and the second network are networks in the same public land mobile network (PLMN), or the first network and the second network are networks in different PLMNs.

According to a third aspect, there is provided paging method, including receiving, by a terminal device, a first paging message sent by a first network device, wherein the first paging message is used for a second network device to page the terminal device; and replying, by the terminal device, to the second network device with a first paging response message, wherein the first network device is a network device in a first network, the second network device is a network device in a second network, and the first network and the second network are different networks among a plurality of networks registered by the terminal device In some possible implementation manners, the replying, by the terminal device, to the second network device with the first paging response message includes replying, by the terminal device, to the second network device with the first paging response message in a second registration area, wherein the second registration area is a registration area of the terminal device in the second network.

In some possible implementation manners, the first paging message includes indication information, and the indication information is used to indicate at least one of identification information of the second network device, standard information of the second network, or identification information of the terminal device in the second network.

In some possible implementation manners, the method further includes sending, by the terminal device, a third message to the first network device, wherein the third message is used to notify the first network device that the terminal device has replied to the second network device with a first paging response message.

In some possible implementation manners, the method further includes when registering with the second network, sending, by the terminal device, a sixth message to the second network device, wherein the sixth message comprises information of the first network device.

In some possible implementation manners, the sixth message further includes a first request, and the first request is used to request to respond to the paging message of the second network device in the first network.

In some possible implementation manners, the method further includes receiving, by the terminal device, a second paging message sent by the first network device, wherein the second paging message comprises a paging message for the terminal device by the first network device and the second network device.

In some possible implementation manners, the method further includes replying, by the terminal device, a second paging response message in the first network and the second network.

According to a fourth aspect, there is provided a network device for performing the method in the first aspect or any possible implementation manner of the first aspect, or for performing the method in the second aspect or any possible implementation manner of the second aspect. Specifically, the network device includes a unit for performing the method in the first aspect or any possible implementation manner of the first aspect, or the network device includes a unit for performing the method in the second aspect or any possible implementation of the second aspect.

According to a fifth aspect, there is provided a network device. The network device includes a memory, a processor, an input interface, and an output interface. The memory, the processor, the input interface, and the output interface are connected through a bus system. The memory is configured to store instructions, and the processor is configured to execute the instructions stored in the memory, to execute the method in the first aspect or any possible implementation manner of the first aspect, or to execute the method in the second aspect or any possible implementation manner of the second aspect.

According to a sixth aspect, there is provided a terminal device for performing the method in the third aspect or any possible implementation manner of the third aspect. Specifically, the terminal device includes a unit for performing the method in the third aspect or any possible implementation manner of the third aspect.

In a seventh aspect, there is provided a terminal device. The terminal device includes a memory, a processor, an input interface, and an output interface. The memory, the processor, the input interface, and the output interface are connected through a bus system. The memory is configured to store instructions, and the processor is configured to execute the instructions stored in the memory to perform the method in the third aspect or any possible implementation manner of the third aspect.

In an eighth aspect, there is provided a computer storage medium for storing computer software instructions used to execute the method in the first to third aspects or any possible implementation manner of the first to third aspects, the computer software instructions including a program designed to execute the above aspects.

In a ninth aspect, there is provided a computer program product including instructions, which when executed on a computer, causes a computer to execute the method in the first to third aspects or any possible implementation manner of the first to third aspects.

BRIEF DESCRIPTION OF THE DRAWINGS

FIG. 1 is a schematic diagram of an example of a communication system to which the embodiments of the present disclosure is applied.

FIG. 2 is a schematic flowchart of a paging method according to an embodiment of the present disclosure.

FIG. 3 is a schematic flowchart of a paging method according to another embodiment of the present disclosure.

DETAILED DESCRIPTION

Figure 4:
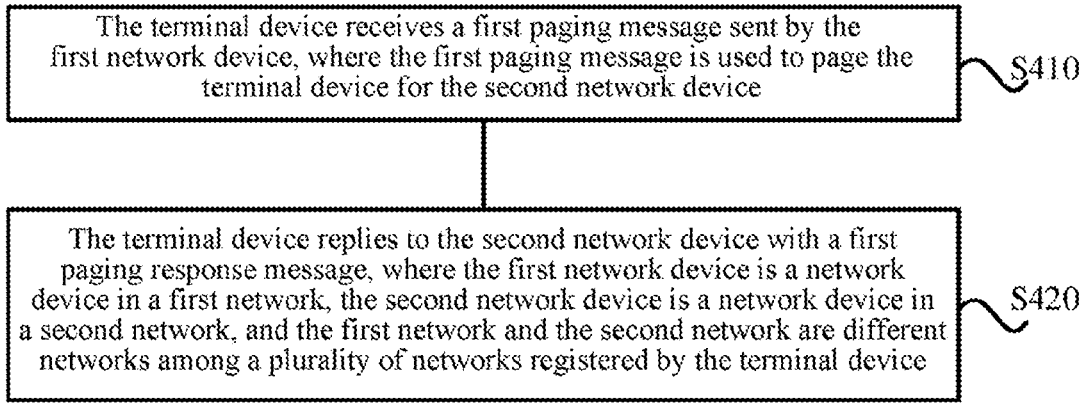
FIG. 4 is a schematic flowchart of a paging method according to still another embodiment of the present disclosure.

The technical solutions in the embodiments of the present disclosure will be described below with reference to the drawings.

It should be understood that the terms "system" and "network" are often used interchangeably herein. The term "and/or" here describes an association relationship between associated objects, indicating that there may be three relationships. For example, A and/or B may mean the following three situations: A exists alone, A and B exist at the same time, B exists alone. In addition, the character "/" here generally indicates that the associated objects are in an "or" relationship.

The embodiments of the present disclosure can be applied to various communication systems, such as a Global System of Mobile Communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), a Wireless Local Area Networks (WLAN), Wireless Fidelity (WiFi), a next-generation communication system or other communication systems, etc.

FIG. 1 shows a wireless communication system 100 applicable to an embodiment of the present disclosure. The wireless communication system 100 may include at least one network device, for example, a first network device 110 and a second network device 120 shown in FIG. 1. Both the first network device 110 and the second network device 120 can communicate with a terminal device 130 through a wireless air interface. The first network device 110 and the second network device 120 can provide communication coverage for a specific geographic area and can communicate with the terminal device located within the coverage area. The first network device 110 or the second network device 120 may be a base station (Base Transceiver Station, BTS for short) in the GSM system or CDMA system, or may be a base station (NodeB) in the WCDMA system, or may be an Evolutional Node B (referred to as "eNB" or "eNodeB") in the LTE system, or a network device in the future 5G network, such as a Transmission Reception Point (TRP), a base station, a small base station equipment, etc., which is not particularly limited in the embodiments of the present disclosure.

The wireless communication system 100 further includes one or more terminal devices (User Equipments, "UEs") 130 located within the coverage of the first network device 110 and the second network device 120. The terminal device 130 may be mobile or fixed. The terminal device 130 may communicate with one or more core networks (Core Networks) via a Radio Access Network (abbreviated as "RAN"). The terminal device may be referred to as an access terminal, a terminal device, a user unit, a user station, a mobile station, a mobile station, a remote station, a remote terminal, a mobile device, a user terminal, a terminal, a wireless communication device, a user agent or a user apparatus. The terminal device may be a cellular phone, a cordless phone, a Session Initiation Protocol (SIP) phone, a Wireless Local Loop (WLL) station, a Personal Digital Assistant ("PDA"), a handheld device, a computing device with wireless communication capabilities, or other processing devices connected to wireless modems, an in-vehicle device, a wearable device, and a terminal device in future 5G networks, etc.

The method for signal transmission according to an embodiment of the present disclosure will be described below with reference to FIGS. 2 to 5. It should be understood that FIGS. 2 to 5 are schematic flowcharts of the method for signal transmission according to an embodiment of the present disclosure, which shows the detailed communication steps or operations of the method, but these steps or operations are only examples, and the embodiments of the present disclosure may also perform other operations or variations of various operations in FIGS. 2 to 5.

FIG. 2 is a schematic flowchart of a paging method according to an embodiment of the present disclosure. As shown in FIG. 2, the method 200 includes the following steps.

In S210, when a second network device determines that downlink data of a terminal device arrives, a first network device sends a first paging message to the terminal device.

The first paging message is used for the second network device to page the terminal device;

The first network device is a network device in a first network, the second network device is a network device in a second network, and the first network and the second network are different networks in a plurality of networks registered by the terminal device.

In the embodiments of the present disclosure, the terminal device may register in a plurality of networks, but paging of the terminal device by the plurality of networks can only be performed in one or more specific networks, so that the terminal device can only monitor a paging message from the specific one or more networks, which is conducive to power saving of the terminal device.

Optionally, in the embodiments of the present disclosure, the first network device may be a network device in a network that can perform paging, and the second network device is a network device in a network that cannot perform paging. When the second network device determines a need to page the terminal device, the second network device pages the terminal device through the first network device. For example, when downlink data of the terminal device arrives in the second network, the second network device determines that it needs to page the terminal device. Further, the second network device may instruct the first network device in the first network to page the terminal device, so that the first network device may initiate paging the terminal device for the second network device.

Optionally, in the embodiments of the present disclosure, there may be one or more first network devices, and there may be one or more second network devices, that is, there may be one or more networks capable of performing paging, and there may be one or more networks that cannot perform paging, which is not limited in the embodiments of the present disclosure.

Optionally, in the embodiments of the present disclosure, the first paging message may include indication information used to indicate that the first paging message is sent by the first network device for the second network device, or to indicate that the second network device wants to page the terminal device.

Optionally, in the embodiments of the present disclosure, the first paging message may be an existing message, and the first network device may carry indication information in the existing message to indicate that the first paging message is used for paging the terminal device for the second network device, or the first paging message may also be a newly added message, which is specifically used for paging the terminal device for a network device in other network, which is not limited in the embodiments of the present disclosure.

Optionally, the indication information is used to indicate at least one of identification information of the second network device, standard information of the second network, or identification information of the terminal device in the second network.

For example, the first paging message may include the identification information of the second network device, for example, device identification of the second network device, or may also include the identification information of the second network, for example, the standard information of the second network, such as LTE, NR, etc., or may also include the identification information of the terminal device in the second network, etc., which is not limited by the embodiments of the present disclosure, as long as the terminal device can determine that the first paging message is a paging initiated by the network device in the second network according to the indication information.

Optionally, in some embodiments, the second network device may send the indication information to the first network device, so that when the first network device pages the terminal device for the second network device, the first network device carries the indication information in the first paging message.

Optionally, in some embodiments, the method 200 further includes the first network device receiving a first message sent by the second network device, where the first message is used to notify the first network device that the second network device needs to send downlink data to the terminal device.

For example, when it is determined that the downlink data of the terminal device arrives, the second network device may send a first message to the first network device, where the first message is used to instruct the first network device to page the terminal device for the second network device, or the first message is used to notify the first network device that the second network device needs to send downlink data to the terminal device, that is, when the second network device needs to page the terminal device, it can send the first message to the first network device so that the first network device can perform paging of the terminal device based on the first message.

Optionally, the second network device may carry the indication information in the first message, so that the first network device can learn the indication information after receiving the first message and can carry the indication information in the first paging message to be sent to the terminal device, indicating that the first paging message is initiated for the network device in the second network.

Optionally, in some embodiments, S210 may include the first network device sending the first paging message to the terminal device in a first registration area, where the first registration area is a registration area of the terminal device in the first network.

Optionally, in some embodiments, the first network device sending the first paging message to the terminal device includes the first network device sending the first paging message to the terminal device in a second registration area, where the second registration area is a registration area of the terminal device in the second network.

That is, the first network device may page the terminal device in the first registration area in the first network of the terminal device, or may page the terminal device in the second registration area of the second network of the terminal device, and the embodiments of the application do not specifically limit the sending area of the first paging message. For example, the first network device may also send the first paging message in a Tracking Area (TA) of the terminal device.

Optionally, in some embodiments, the method further includes the first network device receiving a second message sent by the second network device, where the second message is used to notify the first network device of information about the second registration area.

That is, the second network device may notify the first network device of the information of the second registration area in advance, so that the first network device initiates paging of the terminal device in the second registration area.

Optionally, in the embodiments of the present disclosure, after receiving the first paging message sent by the first network device, the terminal device may reply to the second network device with a first paging response message. Optionally, the terminal device may reply the first paging response message to the second network device in the first network or the second network, which is not limited in the embodiments of the present disclosure.

Optionally, if the terminal device replies with the first paging response message in the first network, after receiving the first paging response message, the first network device may forward the first paging response message to the second network device. Meanwhile, the first network device may also stop paging the terminal device.

Optionally, in some embodiments, the method 200 may further include the first network device receiving a third message sent by the terminal device, where the third message is used to notify the first network device that the terminal device has replied to the second network device with a first paging response message.

Specifically, after the terminal device (for example, in the first network or the second network) replies with the first paging response message, the terminal device may also send a third message to the first network device to notify the first network device that the terminal device has replied with the first paging response message to the second network device. In this way, after the first network device receives the third message, it can stop paging the terminal device.

Optionally, in other embodiments, the method 200 may further include the first network device receiving a fourth message sent by the second network device, where the fourth message is used to notify the first network device that the second network device has received the first paging response message replied from the terminal device, or the fourth message is used to notify the first network device to stop paging the terminal device.

Specifically, after the second network device receives the first paging response message returned by the terminal device, the second network device may send a fourth message to the first network device to notify the first network device that the second network device has received the first paging response message returned by the terminal device, or to notify the first network device to stop paging the terminal device, so that the first network device can stop paging the terminal device after receiving the fourth message.

Optionally, in some embodiments, the method 200 may further include if the second network device does not receive the first paging response message returned by the terminal device, the first network device receiving a fifth message sent by the second network device, and the fifth message is used to notify the first network device to page the terminal device again.

Specifically, if the second network device does not receive the first paging response message sent by the terminal device within a specific time, the second network device may also send a fifth message to the first network device to notify the first network device to page the terminal device again.

Optionally, the specific time may be preset, or specified by the communication system, or determined by the second network device, which is not limited in the embodiments of the present disclosure.

Optionally, in some embodiments, the method 200 may further include if both the first network device and the second network device determine that the downlink data of the terminal device arrives, the first network device sending a second paging message to the terminal device, the second paging message including a paging message for the terminal device by the first network device and the second network device.

That is, the first network device can implement paging of the terminal device by the network devices in at least two networks through one paging message.

Optionally, in some embodiments, the second paging message may include first indication information and second indication information, the first indication information may be used to indicate that the second paging message includes the paging message to the terminal device by the first network device, and the second indication information may be used to indicate that the second paging message includes the paging message for the terminal device by the second network device.

Optionally, the first indication information is used to indicate at least one of identification information of the first network device, standard information of the first network, or identification information of the terminal device in the first network.

Optionally, the second indication information may include at least one of identification information of the second network device, standard information of the second network, or identification information of the terminal device in the second network.

Optionally, after receiving the second paging message, the terminal device determines that the second paging message includes the paging message of the first network device and the second network device to the terminal device. Further, the terminal device may reply the paging response message to both the first network device and the second network device.

Optionally, the terminal device may reply to the first network device with a paging response message in the first network, and reply to the second network device with a paging response message in the second network.

Optionally, the terminal device may also reply a paging response message to the first network device and the second network device in the first network. In this case, the terminal device may include in the paging response message the foregoing first indication information and second indication information to indicate that the paging response message is a paging response to the first network device and the second network device.

Optionally, the terminal device may also reply the paging response message in the second network. In this case, the terminal device may include in the paging response message the foregoing first indication information and second indication information to indicate that the paging response message is a paging response to the first network device and the second network device.

Optionally, in the embodiments of the present disclosure, the first network and the second network may be networks in the same Public Land Mobile Network (PLMN), or the first network and the second network are networks in different PLMNs, which is not limited in the embodiments of the present disclosure.

Optionally, in the embodiments of the present disclosure, the first network device may be an access network device or core network device in the first network, and the second network may be an access network device or core network device in the second network.

For example, if the first network is an NR network and the second network is an LTE network, the first network device may be an access network device (gNB) in the NR system, an Access Management Function (AMF), or Packet Data Network Gateway (PGW), or User Plane Function (UPF), etc., which is not limited by the embodiments of the present disclosure, and the second network device may be a base station (eNB) in an LTE system, a Mobility Management Entity (MME) or a Service Gateway (SGW), etc., which is not limited in the embodiments of the present disclosure.

The paging method according to the embodiment of the present disclosure is described in detail from the perspective of the first network device above with reference to FIG. 2, and the paging method according to another embodiment of the present disclosure is described in detail below with reference to FIG. 3 from the perspective of the second network device. It should be understood that the description on the second network device side corresponds to the description of the first network device side. For similar descriptions, the above contents may be referred to, and to avoid repetition, they are not repeated here.

FIG. 3 is a schematic flowchart of a paging method according to another embodiment of the present disclosure. As shown in FIG. 3, the method 300 includes the following steps.

In S310, the second network device determines that downlink data of the terminal device arrives.

In S320, the second network device sends a first paging message to the terminal device through the first network device, the first network device is a network device in a first network, the second network device is a network device in a second network, and the first network and the second network are different networks among a plurality of networks registered by the terminal device.

Optionally, in some embodiments, the method 300 further includes the second network device sending a first message to the first network device, where the first message is used to notify the first network device that the second network device needs to send downlink data to the terminal device.

Optionally, in some embodiments, the method 300 further includes the second network device sending a second message to the first network device, where the second message is used to notify the first network device of a second registration area of the terminal device in the second network.

Optionally, in some embodiments, the first paging message includes indication information, and the indication information is used to indicate at least one of identification information of the second network device, standard information of the second network, or identification information of the terminal device in the second network.

Optionally, in some embodiments, the method 300 further includes the second network device sending the indication information to the first network device.

Optionally, in some embodiments, the method 300 further includes the second network device sending a fourth message to the first network device, where the fourth message is used to notify the first network device that the second network device has received a first paging response message returned by the terminal device, or the fourth message is used to notify the first network device to stop paging the terminal device.

Optionally, in some embodiments, the method 300 further includes if the second network device does not receive the first paging response message returned by the terminal device, the second network device sending a fifth message to the first network device, the fifth message is used to notify the first network device to page the terminal device again.

Optionally, in some embodiments, the method 300 further includes the second network device receiving a sixth message sent by the terminal device, where the sixth message includes information of the first network device.

Optionally, the sixth message may be sent when the terminal device performs network registration in the second network, and the sixth message may include information of the first network device and/or identification information of the first network.

Optionally, the information of the first network device may be the identification information of the first network device, for example, the device identification of the first network device.

Optionally, the identification information of the first network may be information such as the standard information of the first network that can identify the first network, which is not limited in the embodiments of the present disclosure.

Optionally, in some embodiments, the sixth message further includes a first request, and the first request is used to request a response to the paging message of the second network device in the first network.

That is, the terminal device may request the second network device to respond to the paging message in the first network. Optionally, the second network device may accept or reject the first request of the terminal device. For example, the second network device may reply a sixth response message to the terminal device, which is used to indicate that the second network device accepts or rejects the first request of the terminal device.

Optionally, in some embodiments, the first network and the second network are networks in the same public land mobile network (PLMN), or the first network and the second network are networks in different PLMNs.

The paging method according to the embodiments of the present disclosure is described in detail above from the perspective of the first network device and the second network device with reference to FIGS. 2 and 3, and hereinafter, in conjunction with FIG. 4, a paging method according to yet another embodiment of the present disclosure will be described in detail from the perspective of the terminal device. It should be understood that the description on the terminal device side and the description on the network device side correspond to each other, and similar descriptions can be referred to above, and to avoid repetition, they are not repeated here.

FIG. 4 is a schematic flowchart of a paging method 400 according to yet another embodiment of the present disclosure. The method 400 may be executed by a terminal device in the communication system shown in FIG. 1. As shown in FIG. 4, the method 400 includes the following contents.

In S410, the terminal device receives a first paging message sent by the first network device. The first paging message is used to page the terminal device for the second network device.

In S420, the terminal device replies to the second network device with a first paging response message. The first network device is a network device in a first network, the second network device is a network device in a second network, and the first network and the second network are different networks among a plurality of networks registered by the terminal device.

Optionally, in some embodiments, S429 may include the terminal device replying to the second network device with the first paging response message in a second registration area, where the second registration area is a registration area of the terminal device in the second network.

Optionally, in some embodiments, the first paging message includes indication information, and the indication information is used to indicate at least one of identification information of the second network device, standard information of the second network, or identification information of the terminal device in the second network.

Optionally, in some embodiments, the method 400 further includes the terminal device sending a third message to the first network device, where the third message is used to notify the first network device that the terminal device has responded to the second network device with a first paging response message.

Optionally, in some embodiments, the method 400 further includes when registering with the second network, the terminal device sending a sixth message to the second network device, where the sixth message includes information of the first network device.

Optionally, in some embodiments, the sixth message further includes a first request, and the first request is used to request a response to the paging message of the second network device in the first network.

Optionally, in some embodiments, the method 400 further includes the terminal device receiving a second paging message sent by the first network device, where the second paging message includes a paging message for the terminal device by the first network device and the second network device.

Optionally, in some embodiments, the method 400 further includes the terminal device replying a second paging response message in the first network and the second network.

Figure 5:
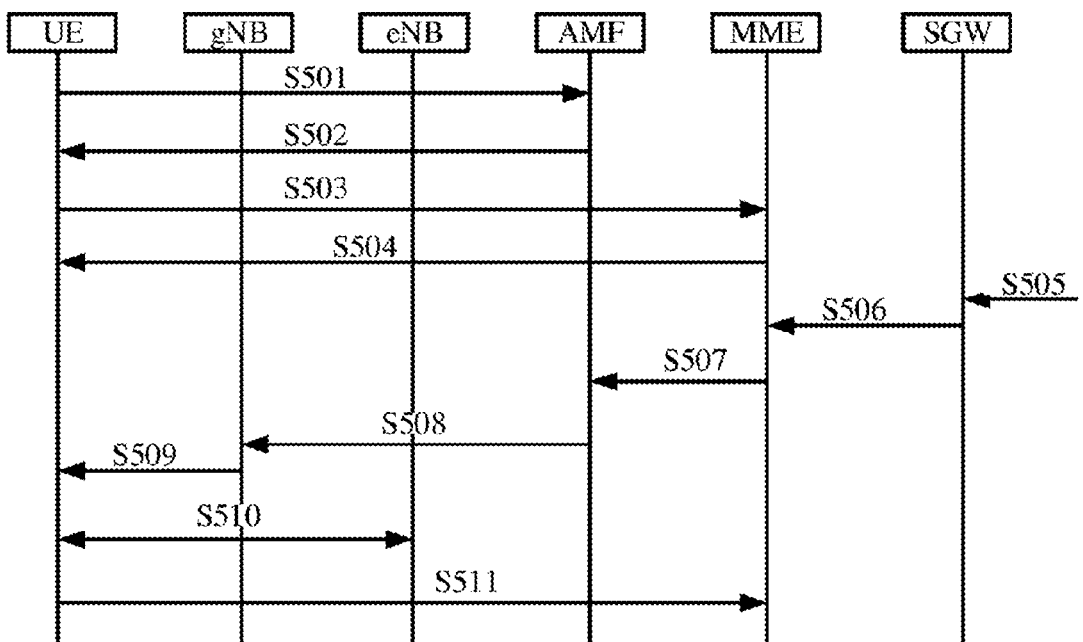
FIG. 5 is a schematic interaction diagram of a paging method according to an embodiment of the present disclosure.

Hereinafter, with reference to FIG. 5, taking the first network as an NR network and the second network as an LTE network as an example, the paging method according to the embodiment of the present disclosure will be described from the perspective of device interaction. As shown in FIG. 5, the paging method may include the following contents.

S501 and S502 are the processes for the UE to register to the NR system, and S503 and S504 are the processes for the UE to register to the LTE system. It should be understood that the two registration processes are in no particular order, and the UE may register to the NR system first or may register to the LTE system first or may register to the two systems at the same time, which is not specifically limited in the present disclosure.

Specifically, in S501, when the UE registers with the NR system, it may send a registration request message to a core network device (for example, AMF) of the NR system.

Further, in S502, the core network device (for example, AMF) of the NR system may reply to the UE with a registration acceptance message.

In S503, when the UE registers with the LTE system, it can send a registration request message to a core network device (for example, MME) of the LTE system.

Optionally, the registration request message may also include information of the NR system, for example, AMF information, etc., so that the core network device of the LTE system determines that the paging to the terminal device can be initiated through the NR system.

Further, in S504, the core network device (for example, MME) of the LTE system may reply to the UE with a registration acceptance message.

So far, the terminal device has been successfully registered in both the LTE system and the NR system.

In S505, the core network device (for example, SGW) in the LTE system determines that the downlink data of the terminal device arrives, that is, determines that the downlink data needs to be sent to the terminal device.

Further, in S506, the SGW notifies the MME in the LTE system.

After the MME in the LTE system learns that the downlink data of the terminal device arrives, in S507, it sends a first message to the core network device (for example, AMF) in the NR system to indicate that the downlink data of the terminal device arrives. Optionally, the first message may carry an Identity (ID) of the UE.

Further, in S508, the core network device (for example, AMF) in the NR system sends a paging request message to the access network device (gNB) in the NR system. Optionally, the paging request message may include the foregoing indication information that is used to indicate that the paging request message is initiated for a network device in the LTE system.

Optionally, the paging request message may be a message used for communication between the core network and the access network.

Thereafter, in S509, the access network device (gNB) in the NR system may send a paging message to the terminal device, and the paging message may include the aforementioned indication information, for example, the identification information of the terminal device in the LTE network, or the standard information of the LTE network, etc.

Further, in S510, the terminal device may initiate a Radio Resource Control (RRC) connection setup process to an access network device (e.g., eNB) in the LTE system to establish the RRC connection of the terminal device and the eNB.

Then, in S511, the terminal device may reply a paging response message to the core network device (for example, MME) in the LTE system.

Therefore, in the embodiments of the present disclosure, the network device in the LTE system can implement paging of the terminal device through the network device in the NR system, so that the terminal device can only receive the paging message in the NR system without receiving the paging message in the LTE system, which is beneficial to the power saving of the terminal device.

The method embodiments of the present disclosure are described in detail above with reference to FIGS. 2 to 5, and the device embodiments of the present disclosure will be described in detail below with reference to FIGS. 6 to 11. It should be understood that the device embodiments and the method embodiments correspond to each other, and the similar description can refer to the method embodiments.

Figure 6:
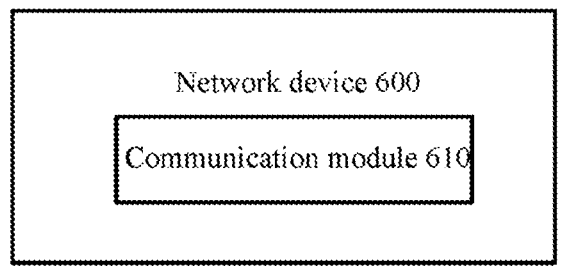
FIG. 6 is a schematic block diagram of a network device according to an embodiment of the present disclosure.

FIG. 6 shows a schematic block diagram of a network device 600 according to an embodiment of the present disclosure. As shown in FIG. 6, the network device 600 includes a communication module 610 configured to when the second network device determines that downlink data of the terminal device arrives, send a first paging message to the terminal device. The first paging message is used to page the terminal device for the second network device;

where the network device is a network device in a first network, the second network device is a network device in a second network, and the first network and the second network are different networks in a plurality of networks registered by the terminal device.

Optionally, in some embodiments, the communication module 610 is further configured to receive a first message sent by the second network device, where the first message is used to notify the network device that the second network device needs to send downlink data to the terminal device.

Optionally, in some embodiments, the communication module 610 is specifically configured to send the first paging message to the terminal device in a first registration area, where the first registration area is a registration area of the terminal device in the first network.

Optionally, in some embodiments, the communication module 610 is specifically configured to send the first paging message to the terminal device in a second registration area, where the second registration area is a registration area of the terminal device in the second network.

Optionally, in some embodiments, the communication module 610 is further configured to receive a second message sent by the second network device, where the second message is used to notify the network device of information about the second registration area.

Optionally, in some embodiments, the first paging message includes indication information, and the indication information is used to indicate at least one of identification information of the second network device, standard information of the second network, or identification information of the terminal device in the second network.

Optionally, in some embodiments, the communication module 610 is further configured to receive the indication information sent by the second network device.

Optionally, in some embodiments, the communication module 610 is further configured to receive a third message sent by the terminal device, where the third message is used to notify the network device that the terminal device has returned a first paging response message to the second network device.

Optionally, in some embodiments, the communication module 610 is further configured to receive a fourth message sent by the second network device, where the fourth message is used to notify the network device that the second network device has received the first paging response message returned by the terminal device, or the fourth message is used to notify the network device to stop paging the terminal device.

Optionally, in some embodiments, the communication module 610 is further configured to if the second network device does not receive the first paging response message returned by the terminal device, receive a fifth message sent by the second network device, and the fifth message is used to notify the network device to page the terminal device again.

Optionally, in some embodiments, the communication module 610 is further configured to if both the network device and the second network device determine that the downlink data of the terminal device arrives, send a second paging message to the terminal device, and the second paging message includes a paging message to the terminal device by the network device and the second network device.

Optionally, in some embodiments, the communication module 610 is further configured to receive a second paging response message returned by the terminal device.

Optionally, in some embodiments, the first network and the second network are networks in the same public land mobile network (PLMN), or the first network and the second network are networks in different PLMNs.

It should be understood that the network device 600 according to the embodiment of the present disclosure may correspond to the first network device in the method embodiment of the present disclosure, and the above and other operations and/or functions of each unit in the network device 600 are respectively for implementing the corresponding process of the first network device in the method 200 in FIG. 2 or the gNB in the method shown in FIG. 5, which will not be repeated here for brevity.

Figure 7:
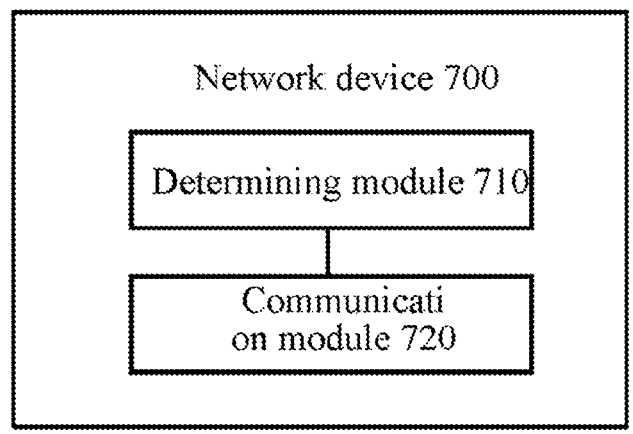
FIG. 7 is a schematic block diagram of a network device according to an embodiment of the present disclosure.

FIG. 7 is a schematic block diagram of a network device according to an embodiment of the present disclosure. The network device 700 of FIG. 7 includes a determining module 710, configured to determine that downlink data of the terminal device arrives; and a communication module 720, configured to send a first paging message to the terminal device through the first network device, the first network device is a network device in a first network, the network device is a network device in a second network, and the first network and the second network are different networks among a plurality of networks registered by the terminal device.

Optionally, in some embodiments, the communication module 720 is further configured to send a first message to the first network device, where the first message is used to notify the first network device that the network device needs to send downlink data to the terminal device.

Optionally, in some embodiments, the communication module 720 is further configured to send a second message to the first network device, where the second message is used to notify the first network device of a second registration area of the terminal device in the second network.

Optionally, in some embodiments, the first paging message includes indication information, and the indication information is used to indicate at least one of identification information of the network device, standard information of the second network, or identification information of the terminal device in the second network.

Optionally, in some embodiments, the communication module 720 is further configured to send the indication information to the first network device.

Optionally, in some embodiments, the communication module 720 is further configured to send a fourth message to the first network device, where the fourth message is used to notify the first network device that the network device has received a first paging response message returned by the terminal device, or the fourth messages is used to notify the first network device to stop paging the terminal device.

Optionally, in some embodiments, the communication module 720 is further configured to if the network device does not receive the first paging response message returned by the terminal device, send a fifth message to the first network device, where the fifth message is used to notify the first network device to page the terminal device again.

Optionally, in some embodiments, the communication module 720 is further configured to receive a sixth message sent by the terminal device, where the sixth message includes information of the first network device.

Optionally, in some embodiments, the sixth message further includes a first request, and the first request is used to request a response to a paging message of the network device in the first network.

Optionally, in some embodiments, the network device accepts or rejects the first request of the terminal device.

Optionally, in some embodiments, the first network and the second network are networks in the same public land mobile network (PLMN), or the first network and the second network are networks in different PLMNs.

Specifically, the network device 700 may correspond to the second network device described in the above method 300, or the eNB in the method shown in FIG. 5 (for example, the network device 700 may be configured in the second network device described in the above method 300 or the eNB in the method shown in FIG. 5, or the network device 700 itself may be the second network device described in the above method 300 or the eNB in the method shown in FIG. 5), and each module or unit in the network device 700 are respectively used to perform various actions or processing procedures performed by the second network device in the above method 300 or the eNB in the method shown in FIG. 5. Here, in order to avoid redundant description, detailed descriptions thereof are omitted.

Figure 8:
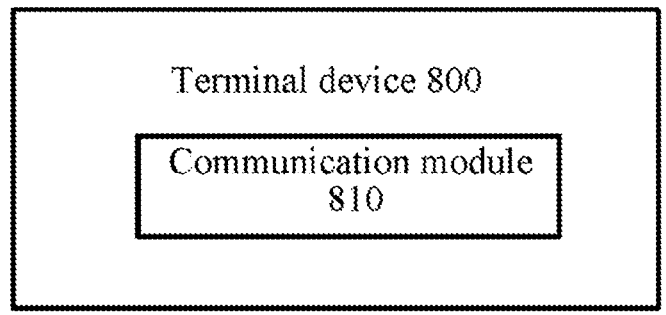
FIG. 8 is a schematic block diagram of a terminal device according to an embodiment of the present disclosure.

FIG. 8 is a schematic block diagram of a terminal device according to an embodiment of the present disclosure. The terminal device 800 of FIG. 8 includes a communication module 810, configured to receive a first paging message sent by a first network device, where the first paging message is used to page the terminal device for a second network device; and reply to the second network device with a paging response message, where the first network device is a network device in a first network, the second network device is a network device in a second network, and the first network and the second network are different networks among a plurality of networks registered by the terminal device.

The communication module 810 is also configured to reply the first paging response message to the second network device in a second registration area.

Optionally, in some embodiments, the first paging message includes indication information, and the indication information is used to indicate at least one of identification information of the second network device, standard information of the second network, or identification information of the terminal device in the second network.

Optionally, in some embodiments, the communication module 810 is further configured to send a third message to the first network device, where the third message is used to notify the first network device that the terminal device has returned a first paging response message to the second network device.

Optionally, in some embodiments, the communication module 810 is further configured to when registering with the second network, send a sixth message to the second network device, where the sixth message includes information of the first network device.

Optionally, in some embodiments, the sixth message further includes a first request, and the first request is used to request a response to a paging message of the second network device in the first network.

Optionally, in some embodiments, the communication module 810 is further configured to receive a second paging message sent by the first network device, where the second paging message includes a paging message for the terminal device by the first network device and the second network device.

Optionally, in some embodiments, the communication module 810 is further configured to reply a second paging response message in the first network and the second network.

Specifically, the terminal device 800 may correspond to (for example, may be configured in or itself is) the terminal device described in the above method 400, and each module or unit in the terminal device 800 is used to perform each action or processing procedure performed by the terminal device in the above method 400 respectively. In order to avoid redundant description, a detailed description thereof is omitted.

Figure 9:
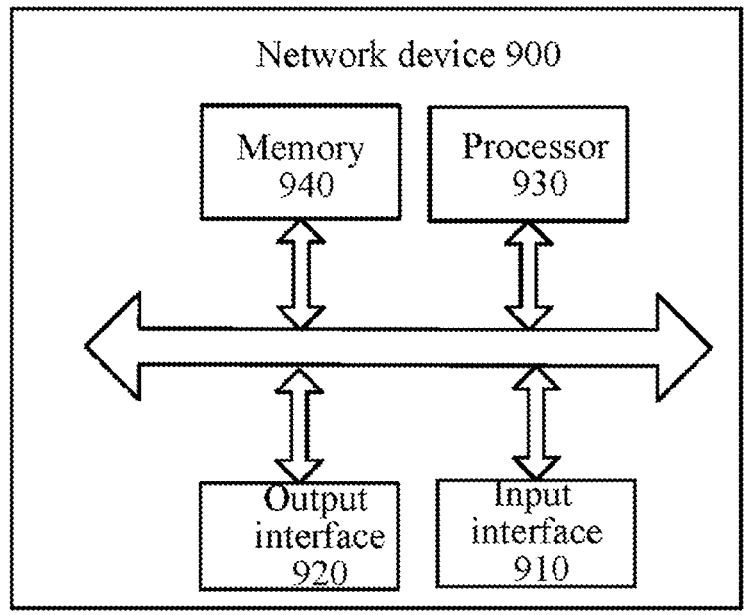
FIG. 9 is a schematic block diagram of a network device according to another embodiment of the present disclosure.

As shown in FIG. 9, an embodiment of the present disclosure further provides a network device 900. The network device 900 may be the network device 600 in FIG. 6, which can be used to execute the content of the first network device corresponding to the method 200 in FIG. 2 or gNB in FIG. 5. The network device 900 includes an input interface 910, an output interface 920, a processor 930, and a memory 940. The input interface 910, the output interface 920, the processor 930, and the memory 940 may be connected through a bus system. The memory 940 is used to store programs, instructions or codes. The processor 930 is configured to execute the programs, the instructions, or the codes in the memory 940 to control the input interface 910 to receive signals, control the output interface 920 to send signals, and complete operations in the foregoing method embodiments.

It should be understood that in the embodiments of the present disclosure, the processor 930 may be a Central Processing Unit (referred to as "CPU"), and the processor 930 may also be other general-purpose processors or digital signal processors (DSP), application specific integrated circuit (ASIC), field programmable gate array (FPGA) or other programmable logic devices, discrete gate or transistor logic devices, discrete hardware components, etc. The general-purpose processor may be a microprocessor or the processor may also be any conventional processor or the like.

The memory 940 may include a read-only memory and a random access memory, and provide instructions and data to the processor 930. A portion of the memory 940 may also include a non-volatile random access memory. For example, the memory 940 may also store device type information.

In the implementation process, each content of the above method may be completed by an integrated logic circuit of hardware or an instruction in the form of software in the processor 930. The content of the method disclosed in conjunction with the embodiments of the present disclosure may be directly embodied and executed by a hardware processor, or may be executed and completed by a combination of hardware and software modules in the processor. The software module may be located in a mature storage medium in the art, such as a random access memory, a flash memory, a read-only memory, a programmable read-only memory, or an electrically erasable programmable memory, and a register. The storage medium is located in the memory 940, and the processor 930 reads the information in the memory 940 and completes the content of the above method in combination with its hardware. In order to avoid repetition, they will not be described in detail here.

In a specific embodiment, the communication module 610 included in the network device 600 in FIG. 6 may be implemented using the input interface 910 and the output interface 920 of FIG. 9.

Figure 10:
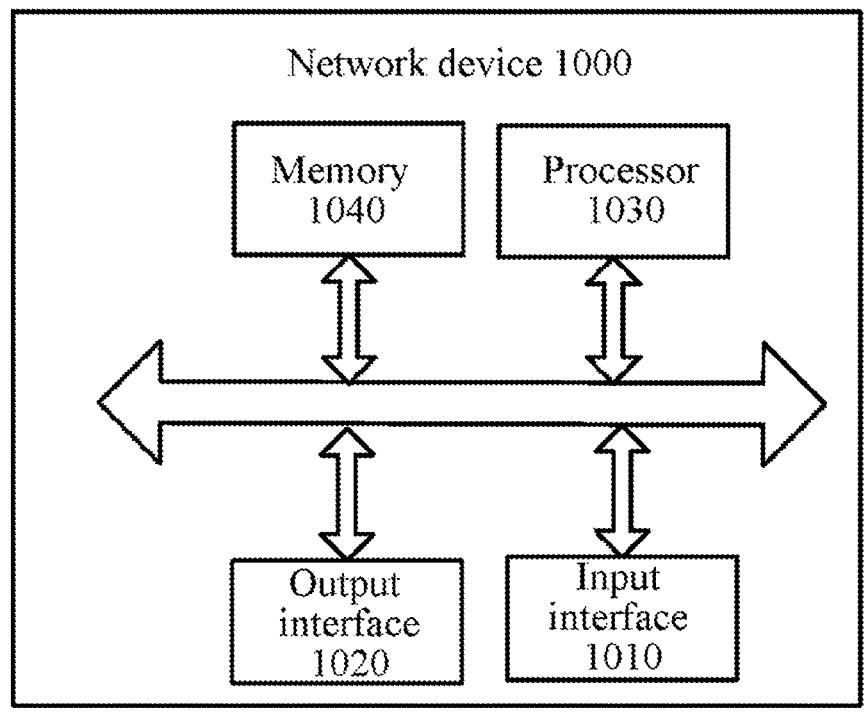
FIG. 10 is a schematic block diagram of a network device according to another embodiment of the present disclosure.

As shown in FIG. 10, an embodiment of the present disclosure further provides a network device 1000. The network device 1000 may be the network device 700 in FIG. 7, which can be used to execute the content of the second network device corresponding to the method 300 in FIG. 3 or the eNB in FIG. 5. The network device 1000 includes an input interface 1010, an output interface 1020, a processor 1030, and a memory 1040. The input interface 1010, the output interface 1020, the processor 1030, and the memory 1040 may be connected through a bus system. The memory 1040 is used to store programs, instructions or codes. The processor 1030 is configured to execute the programs, the instructions, or the codes in the memory 1040 to control the input interface 1010 to receive signals, control the output interface 1020 to send signals, and complete operations in the foregoing method embodiments.

It should be understood that in the embodiments of the present disclosure, the processor 1030 may be a Central Processing Unit ("CPU" for short), and the processor 1030 may also be other general-purpose processors or digital signal processors (DSP), application specific integrated circuit (ASIC), field programmable gate array (FPGA) or other programmable logic devices, discrete gate or transistor logic devices, discrete hardware components, etc. The general-purpose processor may be a microprocessor or the processor may also be any conventional processor or the like.

The memory 1040 may include a read-only memory and a random access memory, and provide instructions and data to the processor 1030. A portion of the memory 1040 may also include a non-volatile random access memory. For example, the memory 1040 may also store device type information.

In the implementation process, each content of the above method may be completed by an integrated logic circuit of hardware or instructions in the form of software in the processor 1030. The content of the method disclosed in conjunction with the embodiments of the present disclosure may be directly embodied and executed by a hardware processor, or may be executed and completed by a combination of hardware and software modules in the processor. The software module may be located in a mature storage medium in the art, such as a random access memory, a flash memory, a read-only memory, a programmable read-only memory, or an electrically erasable programmable memory, and a register. The storage medium is located in the memory 1040, and the processor 1030 reads the information in the memory 1040 and completes the content of the above method in combination with its hardware. In order to avoid repetition, they will not be described in detail here.

In a specific embodiment, the determination module 710 included in the network device 700 in FIG. 7 may be implemented by the processor 1030 in FIG. 10, and the communication module 720 included in the network device 700 in FIG. 7 may be implemented by the input interface 1010 and the output interface 1020.

Figure 11:
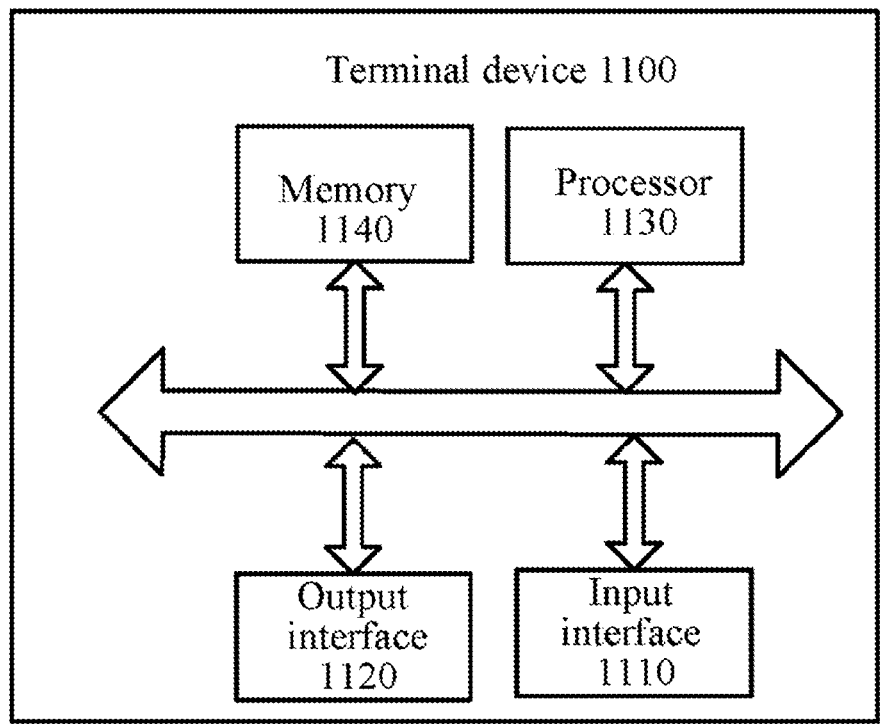
FIG. 11 is a schematic block diagram of a terminal device according to another embodiment of the present disclosure.

As shown in FIG. 11, an embodiment of the present disclosure further provides a terminal device 1100. The terminal device 1100 may be the terminal device 800 in FIG. 8, which can be used to perform the content corresponding to the method 400 in FIG. 4 or the terminal device in FIG. 5. The terminal device 1100 includes an input interface 1110, an output interface 1120, a processor 1130, and a memory 1140. The input interface 1110, the output interface 1120, the processor 1130, and the memory 1140 may be connected through a bus system. The memory 1140 is used to store programs, instructions or codes. The processor 1130 is configured to execute the programs, the instructions, or the codes in the memory 1140 to control the input interface 1110 to receive signals, control the output interface 1120 to send signals, and complete operations in the foregoing method embodiments.

It should be understood that in the embodiments of the present disclosure, the processor 1130 may be a Central Processing Unit (referred to as "CPU"), and the processor 1130 may also be other general-purpose processors or digital signal processors (DSP), application specific integrated circuit (ASIC), field programmable gate array (FPGA) or other programmable logic devices, discrete gate or transistor logic devices, discrete hardware components, etc. The general-purpose processor may be a microprocessor or the processor may also be any conventional processor or the like.

The memory 1140 may include a read-only memory and a random access memory, and provide instructions and data to the processor 1130. A portion of the memory 1140 may also include a non-volatile random access memory. For example, the memory 1140 may also store device type information.

In the implementation process, each content of the above method may be completed by an integrated logic circuit of hardware or instructions in the form of software in the processor 1130. The content of the method disclosed in conjunction with the embodiments of the present disclosure may be directly embodied and executed by a hardware processor, or may be executed and completed by a combination of hardware and software modules in the processor. The software module may be located in a mature storage medium in the art, such as a random access memory, a flash memory, a read-only memory, a programmable read-only memory, or an electrically erasable programmable memory, and a register. The storage medium is located in the memory 1140, and the processor 1130 reads the information in the memory 1140 and completes the content of the above method in combination with its hardware. In order to avoid repetition, they will not be described in detail here.

In a specific embodiment, the communication module 810 included in the terminal device 800 in FIG. 8 may be implemented using the input interface 1110 and the output interface 1120 of FIG. 11.

An embodiment of the present disclosure also provides a computer-readable storage medium that stores one or more programs, the one or more programs include instructions, and when the instructions are executed by a portable electronic device that includes a plurality of application programs, the portable electronic device can execute the method of the embodiments shown in FIGS. 2 to 5.

An embodiment of the present disclosure also proposes a computer program including instructions. When the computer program is executed by the computer, the computer can execute the corresponding flow of the method in the embodiments shown in FIGS. 2 to 5.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to go beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments described above are only schematic. For example, the division of the unit is only a logical function division. In actual implementation, there may be other division manner. For example, a plurality of units or components may be combined or may be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, may be located in one place, or may be distributed on a plurality of network units. Some or all of the units may be selected according to actual needs to achieve the objective of the solution of this embodiment.

In addition, each functional unit in each embodiment of the present disclosure may be integrated into one monitoring unit, or each unit may exist separately and physically, or two or more units may be integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or a part of the steps of the embodiments of this application. The foregoing storage medium includes any medium that can store program codes, such as a USB flash disk, a removable hard disk, a read-only memory (Read-Only Memory, ROM), a random access memory (Random Access Memory, RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for paging, comprising:
    receiving, by a terminal device, a first paging message sent by a first network device, wherein the first paging message is used for a second network device to page the terminal device; and
    replying, by the terminal device, to the second network device with a first paging response message, wherein the first network device is a network device in a first network, the second network device is a network device in a second network, and the first network and the second network are different networks among a plurality of networks registered by the terminal device;
    wherein the replying, by the terminal device, to the second network device with the first paging response message comprises:
    replying, by the terminal device, to the second network device with the first paging response message in a second registration area, wherein the second registration area is a registration area of the terminal device in the second network.

2. The method according to claim 1, wherein the first paging message comprises indication information, and the indication information is used to indicate at least one of identification information of the second network device, standard information of the second network, or identification information of the terminal device in the second network.

3. A network device, comprising:
    a processor; and
    a memory for storing instructions executable by the processor;
    wherein the processor is configured to when a second network device determines that downlink data of a terminal device arrives, send a first paging message to the terminal device,
    wherein the first paging message is used for the second network device to page the terminal device; and
    wherein the network device is a network device in a first network, the second network device is a network device in a second network, and the first network and the second network are different networks among a plurality of networks registered by the terminal device;
    wherein the processor is further configured to:
    receive a third message sent by the terminal device, wherein the third message is used to notify the network device that the terminal device has replied to the second network device with a first paging response message in a second registration area, wherein the second registration area is a registration area of the terminal device in the second network.

4. The network device according to claim 3, wherein the processor is further configured to:
    receive a first message sent by the second network device, wherein the first message is used to notify the network device that the second network device needs to send downlink data to the terminal device.

5. The network device according to claim 3, wherein the processor is further configured to:
    send the first paging message to the terminal device in a first registration area, wherein the first registration area is a registration area of the terminal device in the first network.

6. The network device according to claim 3, wherein the processor is further configured to:
    send the first paging message to the terminal device in the second registration area.

7. The network device according to claim 6, wherein the processor is further configured to:
    receive a second message sent by the second network device, wherein the second message is used to notify the network device of information about the second registration area.

8. The network device according to claim 3, wherein the first paging message comprises indication information, and the indication information is used to indicate at least one of identification information of the second network device, standard information of the second network, or identification information of the terminal device in the second network.

9. The network device according to claim 8, wherein the processor is further configured to:
    receive the indication information sent by the second network device.

10. The network device according to claim 3, wherein the processor is further configured to:
    receive a fourth message sent by the second network device, wherein the fourth message is used to notify the network device that the second network device has received a first paging response message returned by the terminal device, or the fourth message is used to notify the network device to stop paging the terminal device.

11. The network device according to claim 3, wherein the processor is further configured to:
    when the second network device does not receive a first paging response message returned by the terminal device, receive a fifth message sent by the second network device, wherein the fifth message is used to notify the network device to page the terminal device again.

12. The network device according to claim 3, wherein the processor is further configured to:
    when both the network device and the second network device determine that the downlink data of the terminal device arrives, send a second paging message to the terminal device, wherein the second paging message comprises a paging message for the terminal device by the network device and the second network device.

13. A terminal device, comprising:
    a processor; and a memory for storing instructions executable by the processor;

wherein the processor is configured to:

receive a first paging message sent by a first network device, wherein the first paging message is used for a second network device to page the terminal device; and reply to the second network device with a paging response message in a second registration area, wherein the first network device is a network device in a first network, the second network device is a network device in a second network, and the first network and the second network are different networks among a plurality of networks registered by the terminal device, wherein the second registration area is a registration area of the terminal device in the second network.

14. The terminal device according to claim 13, wherein the processor is further configured to:

send a third message to the first network device, wherein the third message is used to notify the first network device that the terminal device has replied to the second network device with a first paging response message.

15. The terminal device according to claim 13, wherein the processor is further configured to:

when registering with the second network, send a sixth message to the second network device, wherein the sixth message comprises information of the first network device.

16. The terminal device according to claim 15, wherein the sixth message further comprises a first request, and the first request is used to request to respond to the paging message of the second network device in the first network.

17. The terminal device according to claim 13, wherein the processor is further configured to:

receive a second paging message sent by the first network device, wherein the second paging message comprises a paging message for the terminal device by the first network device and the second network device.

18. The terminal device according to claim 17, wherein the processor is further configured to:

reply a second paging response message in the first network and the second network.

* * * * *